(12) United States Patent
Busch et al.

(10) Patent No.: US 7,771,493 B2
(45) Date of Patent: Aug. 10, 2010

(54) PROCESS FOR CRYSTALLISING AMORPHOUS PLASTIC GRANULATES

(75) Inventors: Detlef Busch, Saarlouis (DE); Harald Eiden, Homburg (DE); Bertram Schmidt, Sarreguemines (FR)

(73) Assignee: Treofan Germany GmbH & Co. KG (DE)

( * ) Notice: Subject to any disclaimer, the term of this patent is extended or adjusted under 35 U.S.C. 154(b) by 637 days.

(21) Appl. No.: 11/597,683

(22) PCT Filed: May 13, 2005

(86) PCT No.: PCT/EP2005/052212

§ 371 (c)(1),
(2), (4) Date: Nov. 21, 2006

(87) PCT Pub. No.: WO2005/115707

PCT Pub. Date: Dec. 8, 2005

(65) Prior Publication Data

US 2007/0220712 A1    Sep. 27, 2007

(30) Foreign Application Priority Data

May 26, 2004  (DE) ........................ 10 2004 025 800

(51) Int. Cl.
*B01D 9/00* (2006.01)
(52) U.S. Cl. ..................................... 23/295 R; 23/296

(58) Field of Classification Search ............... 23/295 R, 23/296
See application file for complete search history.

(56) References Cited

U.S. PATENT DOCUMENTS

| 5,208,297 A | 5/1993 | Ford et al. |
| 5,247,058 A | 9/1993 | Gruber et al. |
| 5,357,035 A | 10/1994 | Gruber et al. |
| 5,532,335 A | 7/1996 | Kimball et al. |

FOREIGN PATENT DOCUMENTS

| DE | 37 33 793 | 4/1989 |
| DE | 198 48 245 | 5/2000 |
| EP | 0 953 589 | 11/1999 |
| EP | 1 114 840 | 7/2001 |
| WO | WO-00/68294 | 11/2000 |
| WO | WO-2004/033174 | 4/2004 |

OTHER PUBLICATIONS

International Preliminary Examination Report of PCT/EP05/052212.

*Primary Examiner*—Edward M Johnson
(74) *Attorney, Agent, or Firm*—Connolly Bove Lodge & Hutz LLP

(57) ABSTRACT

A process for crystallizing amorphous polymers whose Tg lies below the crystallite melting point. According to this process, amorphous or partially crystalline polymer grains are exposed in water for a period of at least 30 seconds to a temperature in the polymer crystallization range.

15 Claims, No Drawings

PROCESS FOR CRYSTALLISING AMORPHOUS PLASTIC GRANULATES

RELATED APPLICATIONS

This application is a national stage application (under 35 U.S.C. 371)of PCT/EP2005/052212 filed May, 13, 2005, which claims benefit of German application 10 2004 025 800.7 filed May 26, 2004.

The invention relates to a process for crystallizing at least the surface skin of grains of an amorphous plastic granulate, preferably of an amorphous granulate made from polyhydroxycarboxylic acids.

Plastic granulates such as for example thermoplastic polyester made from aromatic or aliphatic carboxylic acids, for example polyethylene terephthalate PET or polyhydroxycarboxylic acids such as polylactic acid PLA, may be present in amorphous or crystalline form. In the making of granulates, the polymers are first melted in an extruder and extruded for example in the form of a strand. The formed melt is cooled, and the cooled strand is reduced in size to granules. Under these conditions, amorphous modifications of the polymers or granules with a very low crystallite content are generally formed upon cooling. In this amorphous form, the material generally can not be processed to superior products. Therefore, a crystallization or recrystallization is required. In order to transform the granulate from the amorphous into the crystalline state, it has to be heated to the crystallization temperature and remain at that temperature for a sufficient period of time. For common aromatic polyesters, this temperature is 90 to 110° C.; for PLA it is 50 to 100° C. For the crystallization of aromatic polyesters, such as e.g. PET, known processes have proved to be of value. For example, PET is recrystallized in hot air according to the state of the art. For this, the granulate is fed into an agitated hopper with agitator, through which it falls while the agitator rotates slowly. Simultaneously, a heating gas, such as for example air or nitrogen, is blown into the agitated hopper from the bottom in counterflow to the falling movement of the granulate. The heating gas has a temperature for example of 125° C. and heats the PET to crystallization temperature while it is being stirred. This process is described for example in DE 37 33 793.

Within the scope of the present invention, it was found that such hot air processes are not suitable for crystallizing aliphatic polyhydroxycarboxylic acids (PHCs) such as PLA and polyesters with low glass-transition temperature. It transpired that the amorphous PHC granules stick together during crystallization despite agitation. The granules turn soft and sticky on the surface during heating in the hot air stream before the crystallization temperature is reached and the crystallization can begin. The soft granules stick together and form agglomerations that plug the raw material conduits and the outlet of the agitated hopper. In the end, the crystallization operation has to be terminated and the apparatus has to be cleaned mechanically prior to the next start-up. In practice, the process is not usable for PHCs such as e.g. PLA.

Investigations have shown that it is not possible to regulate the temperature in the known hot air processes in such a way that these interruptions are effectively avoided. Amorphous PLA granules already soften at about 60° C., before the crystallization starts at about 80° C., due to their glass transition temperature. Therefore, upon heating of the grains to above 60° C., a sticking together of the still amorphous granules takes place, before the formation of an at least semi-crystalline surface of the granulate prevents this sticking together. Moreover, the heat that is released during the crystallization of PLA additionally complicates the temperature regulation of the process. During start-up, initially an air temperature of about 80° C. is required in order to get the recrystallization going. With the beginning of the crystallization of the material, energy in the form of heat is additionally released and leads to local over-heating, which additionally increases the sticking together and the formation of agglomerations. Therefore, it is hardly possible to adjust and control an optimal temperature profile in the agitated hopper. The process is utterly unsuitable for such materials.

Therefore, the invention is based on the object to provide a process for at least partially crystallizing amorphous plastic granulates which upon heating tend to stick together due to e.g. polar groups, particularly for such plastics whose Tg is significantly lower than their crystallization temperature. The process should be operated without trouble and should generate free-flowing, at least semi-crystalline granulate without agglomerations.

This object is solved by a process for crystallizing amorphous or semi-crystalline polymers, characterized in that the polymer is subjected to a temperature within the crystallization range for a duration of at least 30 seconds in water, and the water is subsequently separated, and the at least semi-crystalline granulate is dried.

Amorphous or semi-crystalline polymers change into the crystalline state that is for the most part more favorable energetically within a certain temperature range. This temperature range is generally between the glass transition temperature and the melting point of the polymer (crystallization range is from >Tg to <m.p. of the polymer) and, in the context of the present invention, is referred to as "crystallization range". Preferably, in terms of the present invention, the crystallization range is a temperature of 5° C. above the Tg to 5° C. below the melting point of the polymer.

The crystallization range, melting point m.p. of the polymer, its glass transition temperature Tg, and the crystallization temperature Tm may be determined individually for each polymer by means of DSC. The DSC curves show for amorphous or semi-crystalline polymers a characteristic curve shape with an endothermic peak at the glass transition point as well as in the range of the melting point, at which crystalline areas in the polymer do no longer exist. In this temperature range between the glass transition temperature and the melting temperature, in addition, due to the higher heat flow during crystallization, an exothermic peak ($\Delta H_{cryst.}$) appears, the maximum of which corresponds to the crystallization temperature Tm. The crystallization range is the temperature range between the Tg and the melting point, within which the exothermic peak is located. The degree of crystallinity of the polymer may be determined from the integral of the exothermic peak and the endothermic melt peak and is then calculated as follows:

Degree of Crystallinity [%]=100*[($\Delta H_{m.p.}-\Delta H_{cryst.}$)/ $\Delta H_{m.p.}$]

For the measurement of the DSC curve and the determination of the degree of crystallinity, 5 to 10 mg of the granulate to be examined is heated in the temperature range of 40-190° C. with a heating rate of 10° C./min. The enthalpies $\Delta H_{m.p.}$ and $\Delta H_{cryst.}$ are thereby determined by integration over the peak areas.

The process according to the invention is especially advantageously suitable for crystallizing polymers whose Tg is at least 10° C. below the crystallization temperature $T_m$, preferably for such polymers, whose Tg is 15 to 50° C. below the crystallization temperature $T_m$, particularly in case the polymer tends to stick together during heating to temperatures above Tg.

Surprisingly, the process according to the invention features substantial advantages. The water is the heat carrier and serves to heat the amorphous polymer, for example PLA, to a temperature within the crystallization range. When the crystallization starts, the released heat may quickly and evenly be dissipated to the surrounding water, so that local overheating is surprisingly well prevented. By this, the temperature of the process can be much better controlled and regulated. During heating, until the start of the crystallization process, the water advantageously serves as separation medium between the individual granules, so that a sticking together of the heated, but still amorphous grains with one another is effectively prevented. Even though the grains sediment in water, in case of polymers having a high density of greater than 1 g/cm$^3$, such as e.g. amorphous PLA, the water apparently reduces the melt pressure of the grains on one another, so that hereby the sticking together is effectively counteracted.

It is simple to technically implement the process. Any form of granulate may be crystallized. The process may be advantageously combined with other processes as an individual stage. The process may be operated in a trouble-free fashion and reliably provides granulate with the desired amount of crystallinity, i.e., only a partial crystallization, for example of the surface skin of the granules, or a complete crystallization of the granulate may be carried out.

Surprisingly, a duration of treatment of at least 30 seconds is enough to initiate the crystallization of at least the surface skin, so that a sticking together of the granules no longer occurs, even at elevated temperatures. Surprisingly, the process according to the invention is also suitable for polymers which are susceptible to decomposition reactions via hydrolysis, such as for example PLA. It was feared that a treatment of amorphous PLA in water at an elevated temperature would lead to increased decomposition via hydrolysis. Surprisingly, this is not the case, as can be seen from relevant investigations of the melt-flow index before and after crystallization.

The process according to the invention may for example be used for crystallizing amorphous polymers that are granulated directly following their production. The process is also especially advantageously suited for the reprocessing of recyclate. In accordance with the process according to the invention, for example PLA in the form of powder, granules or cuttings (reclaim) is first granulated in a suitable device in a manner known per se. For this, the starting material is melted in an extruder, extruded, cooled and granulated. The accumulating amorphous granules may first be dried, if for example an intermediate storage of this material is required for logistical reasons. The drying of the moist amorphous granulate may be omitted if, immediately following the granulation, the crystallization in accordance with the process according to the invention takes place. For this, the amorphous granules are fed into a receptacle with water, this water preferably being heated to a temperature within the crystallization range, for PLA preferably to at least 80° C., prior to adding the granulate. After a dwell period of preferably 60 sec to a maximum of 5 minutes, the crystallized or semi-crystalline granulates are separated from the water and dried in a manner known per se. A sticking together during drying of the crystallized granules is effectively prevented since at least the surface skin of the granules is crystallized and therefore the crystalline or semi-crystalline polymer no longer softens or sticks together at the drying temperatures.

In a preferred embodiment, the water is heated prior to feeding the amorphous or semi-crystalline granulates, preferably to a temperature of 5° C. above Tg to 5° C. below the melting point of the respective polymer, for PLA preferably to 80 to 100° C. In principle, the temperature of the water prior to and during crystallization should be within the crystallization range. Naturally, the temperature of the water does not exceed 100° C. (at normal pressure). Thereby, an overheating during crystallization is practically impossible. Preferably, the water is heated to a temperature of 10 to 50° C. above Tg, more preferably to a temperature of 20 to 40° C. above Tg, for PLA preferably to a temperature of 85 to 100° C., more preferably 85 to 95° C.

The amorphous granules to be crystallized are preferably pre-heated prior to introduction into the water, generally at least to room temperature. Advantageously, the heating may occur to temperatures up to a few degrees centigrade below the glass transition temperature Tg. In any case, the heating should occur evenly, local overheating must be avoided, so that a sticking together of granulate does not take place during pre-heating. Preferably, the granulate is heated to a temperature of 5 to 30° C. below Tg. For PLA it is preferred to pre-heat the amorphous granules to 30 to 50° C. For this moderate pre-heating, common processes may be employed, for example a hot air stream, preferably with simultaneous stirring of the granulate. Subsequently, the preferably pre-heated granulate is fed into the water, so that the granules are subjected to a temperature within the crystallization range in the water. Generally, the temperature of the water is controlled and, if necessary, heat losses are compensated during crystallization, so that the temperature of the water is within the crystallization range during the entire time. Consequently, if necessary, it has to be heated during the crystallization process. In case of an exothermic crystallization, such as for example with PLA, this will not be necessary if the heat of crystallization that is released inevitably causes a heating to this temperature range.

In another alternative of the process, the granulation to amorphous granules takes place at an elevated temperature, or without significant cooling, so that the amorphous granules have an elevated temperature through granulation. Subsequently, the still heated amorphous granulate is directly fed into the "hot" water, so that a cooling after granulation is avoided or minimized. With this alternative of the process, the step of a separate pre-heating of the amorphous granulate is saved.

The dwell time of the granules in the water at a temperature in the crystallization range should be at least 30 sec, preferably 1 to 5 minutes, so that at least the surface skin of the granules crystallizes. Longer dwell times may lead to the dissolving out of water-soluble additives or to decomposition, particularly with PLA, and are therefore to be avoided. Surprisingly, PLA is not decomposed via hydrolysis during the crystallization in accordance with the process according to the invention. The longer the dwell time or the higher the temperature, the higher is the crystalline content in the granule at the end of the process. For PLA, it is preferred to subject the amorphous grains to a temperature of 85 to 95° C. for a duration of 3 to 4 minutes in water in order to achieve a complete crystallization.

The hot water with the granules may optionally be stirred during crystallization in order to promote a uniform temperature throughout the receptacle. This is especially advisable if additional heating or cooling has to take place during the crystallization process.

In case of a partial crystallization in accordance with the process according to the invention, the granules that are crystallized at the surface may subsequently be post-crystallized in a drying step at an elevated temperature, preferably at 80-120° C.

In the process according to the invention, granulates of any form may be used; generally, spherical, cylindrical, or rod-shaped or lens-shaped granulates are formed during granulation. The process is suitable for all common granulate forms and is thus especially flexible in this respect. The selection of the granulate form may therefore advantageously occur with regard to the density of the bulk material that is optimal for the later use of the crystallized granulate. The grain size of the amorphous granulates to be crystallized should generally be between 2 and 8 mm. The size of the granules should generally be selected in such a way that a problem-free reutilization is guaranteed. When using the recrystallizate together with virgin row material, for reasons of a better miscibility, the shape and size of the granules should correspond to those of the virgin granulate.

In order to provide a sufficiently large heat capacity during crystallization, at least 3 liters of water per kilogram of granulate should be provided during the implementation of the process according to the invention. Thereby, a stable temperature control during the process is guaranteed, and a sticking together of the granules during the crystallization process is avoided. Fundamentally, the process may also be implemented with lower ratios. Then, it is advantageous to adjust the optimal crystallization temperature by means of a heating/cooling loop. The heat of crystallization of ~14 kJ/(kg° C.) that is released during the crystallization of 1 kg of PLA is hereby sufficient to heat 1 kg of the bath used for the crystallization by 3.3° C. The excess energy resulting herefrom may be compensated by means of e.g. heat exchangers, evaporation of the bath, or heating of the not pre-heated PLA granulate.

After crystallization, the granules are separated from the water and dried in a manner known per se. As a result, depending upon the type of embodiment, crystalline or semi-crystalline granulates are present, which have at least a crystalline surface skin. In case of semi-crystalline granulates, the drying may advantageously occur in one step with a post-crystallization, wherein the drying occurs at a temperature within the crystallization range. Since in accordance with the process according to the invention at least a crystalline surface skin was produced, sticking together of the granules, for example in the hot air stream, no longer occurs.

In another advantageous embodiment of the process, auxiliary agents may be added to the water bath, which favorably affect the processing and drying of the granulate. Such additives, such as for example silicone oils or fatty acid amides, glycerins and the like, at least partially settle on the surface of the granules and that way promote for example as separating agent the good processability of the granulate after crystallization.

The process according to the invention is especially advantageous for the crystallization of polymers made from aliphatic hydroxycarboxylic acids. Homopolymers or mixed polymers that are composed of polymerized units of aliphatic hydroxycarboxylic acids, in particular lactic acids, are meant herewith. These are referred to as PLA (polylactic acid) below. Here as well, with the term PLA are meant both homopolymers which are composed only of lactic acid units, and mixed polymers which predominantly contain lactic acid units (>50%) in compounds with other aliphatic hydroxycarboxylic acid units.

As monomers of aliphatic polyhydroxycarboxylic acid (PHC) are particularly suitable aliphatic mono-, di-, or trihydroxycarboxylic acids or their dimeric cyclic esters, among which lactic acid in its D- or L-form is preferred. A suitable PLA is for example polylactic acid from Cargill Dow (NatureWorks®). The production of polylactic acid is known in the state of the art and occurs via catalytic ring opening polymerization of lactide (1,4-dioxane-3,6-dimethyl-2,5-dione), the dimeric cyclic ester of lactic acid, PLA is therefore also often referred to as polylactide. In the following publications, the production of PLA is described—U.S. Pat. Nos. 5,208,297, 5,247,058, or 5,357,035.

PLA homopolymers contain 80-100 wt % of L-lactic acid units, corresponding to 0 to 20 wt % of D-lactic acid units. In order to reduce the crystallinity, even higher concentrations of D-lactic acid units may also be contained as comonomer. Optionally, the polylactic acid can additionally have as comonomer aliphatic polyhydroxycarboxylic acid units that are different from lactic acid, for example glycolic acid units, 3-hydroxypropionic acid units, 2,2-dimethyl-3-hydroxypropionic acid units, or higher homologs of hydroxycarboxylic acids with up to 5 carbon atoms.

Preferred lactic acid polymers (PLA) have a melting point of 110 to 170° C., preferably 125 to 165° C., and a melt-flow index (measured according to DIN 53 735 at 2.16 N load and 210° C.) of 1 to 50 g/10 min, preferably 1 to 30 g/10 min. The molecular weight of PLA is in a range of at least 10,000 to 500,000 (number average), preferably 50,000 to 300,000 (number average). The glass transition temperature Tg is in a range of 40 to 100° C., preferably 40 to 80° C.

The invention is explained below using examples which, however, are not intended to limit the inventive idea set forth above.

EXAMPLE 1

In an extruder, polylactic acid having a melting point of 151° C., a Tg of 58° C., and a MFI of 3.1 g/10 min (measured according to DIN 53 735 at a temperature of 210° C.) was melted. The hot melt was extruded as strand. The extruded melt strand was sprayed with water and cooled and cut into granules by means of a rotating knife. In this manner, rod-shaped amorphous granules of PLA were obtained. The amorphous granulate had a melting point of 150° C.; a glass transition temperature Tg of 58° C.; the MFI was 5.2 g/10 min (measured according to DIN 53 735 at a temperature of 210° C.).

In the next step, 500 g of these amorphous granules were heated to a temperature of 53° C. in an agitated hopper by means of hot air while stirred and fed into a water bath of 3 liters with stirrer, the water temperature of which was 95° C. (corresponding to 37° C. above Tg). After feeding of the granulate that is about 53° C. warm, the temperature of the water bath falls to 82° C. The granulate is stirred in the water, the temperature of the water increasing from 82° C. to about 85° C. After 3 minutes, the temperature remains constant. After a temperature increase is no longer observed, the water is drained and the crystallized granulate is removed from the container. The granulate is pre-dried in a centrifuge, and dried in the usual manner at 100° C. for 4 h in order to remove the residual moisture.

In this manner, 500 g PLA with a crystallinity of about 80% are obtained, whose melting point is 150° C., Tg is 58° C., and MFI is 6.3 g/10 min (measured according to DIN 53 735 at a temperature of 210° C.).

EXAMPLE 2

As described in Example 1, PLA reclaim was extruded and amorphous granulate with a melting point of 150° C., a Tg of 58° C., and a MFI of 9.8 g/10 min (measured according to DIN 53 735 at a temperature of 210° C.) was obtained. 500 g of the amorphous granulate was pre-heated to 53° C. as described in Example 1, and fed into the same water bath (3 liters; 95° C. with stirrer). After 120 sec, the water was drained and a semi-crystalline granulate was removed, the crystallinity of which was about 20%. This material was centrifuged and dried in an agitated hopper in counterflowing hot air at 100° C. for 2 h, during which it completely crystallized. During this process, sticking together of the granules did not occur. As a result, a free-flowing granulate was removed at the outlet of the agitated hopper, whose melting point was 150° C., Tg: 58° C., and MFI of 7.4 g/10 min (measured according to DIN 53 735 at a temperature of 210° C.).

EXAMPLE 3

In an extruder, polylactic acid (not recyclate) having a melting point of 152° C., a Tg of 60° C., and a MFI of 3.1 g/10 min (measured according to DIN 53 735 at a temperature of 210° C.) was melted at 190° C. The hot melt was extruded as strand. The extruded melt strand was sprayed with water and cut into cylindrical granules by means of a rotating knife.

Via a hopper, the cut granulate is directly fed into a water bath, the water of which has a temperature of about 95° C. After a dwell period of 3 minutes, the granulate is separated from the water and pre-dried by means of a centrifuge. The crystallinity measured subsequently was 80%. After drying of the granulate in counterflowing hot air at 100° C. (2 h), a completely crystallized granulate having a melting point of 151° C., a Tg of 59° C., and a MFI of 6.0 g/10 min (measured according to DIN 53 735 at a temperature of 210° C.) is obtained.

EXAMPLE 4

Example 4 was performed as described in Example 1. In contrast to Example 1, as starting material, PLA cuttings and other process waste was melted at 185° C. and processed to amorphous granulate.

The amorphous granulate has a melting point of 150° C.; a Tg of 58° C., and a MFI of 12.1 g/10 min (measured according to DIN 53 735 at a temperature of 210° C.). 500 g of the amorphous granulate was pre-heated to 53° C. as described in Example 1, and fed into the same water bath (3 liters, 95° C. with stirrer). After 120 sec, the water was drained and a semi-crystalline granulate was removed (crystallinity: 20%). This material was dried in an agitated hopper in counterflowing hot air at 100° C. for 2 h and completely crystallized. Sticking together of the granules did not occur. As a result, a free-flowing, completely crystallized granulate was removed at the outlet of the stirred hopper. Melting point: 150° C., Tg: 58° C., and MFI of 9.4 g/10 min (measured according to DIN 53 735 at a temperature of 210° C.).

The invention claimed is:
1. A process for crystallising polyhydroxycarboxylic acid having a glass transition temperature Tg of 50 to 70° C., wherein the polyhydroxycarboxylic acid is formed into amorphous granules, which comprises
preheating said amorphous polyhydroxycarboxylic acid granules to a temperature of at least 40 to 5° C. below their Tg,
subjecting the amorphous granules to a temperature of >70 to 100° C. in water for a duration of 3 to 5 minutes,
subsequently separating the water and
drying the at least semi-crystalline granulate,
wherein the polyhydroxycarboxylic acid granules have a crystallinity of 80-100% after drying.
2. The process according to claim 1, wherein the pre-heating of the amorphous granules occurs by means of hot air.
3. The process according to claim 1, wherein the water is connected to a heating and/or cooling loop, and that its temperature is regulated during crystallization in such a way that it is within the crystallization range of the polymer.
4. The process according to claim 1, wherein during production of the amorphous granules, after extrusion, the amorphous granules are cooled to a temperature of 1 to 20° C. below the Tg of the polymer during granulation, and the amorphous granules having this temperature are directly fed into the water.
5. The process according to claim 1, wherein the amorphous granules are stirred in the water during crystallization.
6. The process according to claim 1, wherein the amorphous granules are lens-shaped, cylindrical, or rod-shaped.
7. The process according to claim 1, wherein the average particle diameter of the amorphous granules is in the range of 1 to 10 mm.
8. The process according to claim 1, wherein amorphous granules are subjected to a temperature of >70 to 100° C. in a water bath and the water bath comprises at least 0.5 liters of water per kilogram of introduced granulate.
9. The process according to claim 8, wherein the water bath comprises at least 1-3 liters of water per kilogram of introduced granulate.
10. The process according to claim 1, wherein said amorphous polyhydroxycarboxylic acid granuale is an amorphous polylactic acid (PLA) granulate.
11. The process according to claim 10, wherein the crystalline or semi-crystalline PLA granulate has a crystallinity of 10-100%.
12. The process according to claim 1, wherein the amorphous granulate has a MFI of 1-50 g/10 min (measured according to DIN 53 735 at a temperature of 210° C.), and the crystalline or semi-crystalline PLA has a MFI of 1-50 g/10 min after crystallization, and the MFIs of the amorphous granulate and the crystalline or semi-crystalline granulate differ by 0 to 20 units.
13. The process according to claim 1, wherein the water contains glycerin fatty acid esters, fatty acid amides, or silicone oil, or other separating agents.
14. A process for crystallizing amorphous or semi-crystalline polyhydroxycarboxylic acid, which comprises
forming a polymer into amorphous granules,
subjecting the amorphous granules to a temperature of from above the glass transition temperature Tg to below the melting point of the polymer in water for a duration of at least 30 seconds,
subsequently separating the water, and
drying the at least semi-crystalline granulate.
15. A process for crystallizing amorphous or semi-crystalline polymer which comprises
forming the polymer into amorphous granules,
subjecting the amorphous granules to a temperature of >70 to 100° C. in water for a duration of at least 30 seconds,
subsequently separating the water, and
drying the at least semi-crystalline granulate.

* * * * *